(12) United States Patent
Chamness et al.

(10) Patent No.: US 9,477,661 B1
(45) Date of Patent: Oct. 25, 2016

(54) METHOD AND APPARATUS FOR PREDICTING POTENTIAL REPLICATION PERFORMANCE DEGRADATION

(71) Applicant: EMC Corporation, Hopkinton, MA (US)

(72) Inventors: Mark Chamness, Menlo Park, CA (US); Michael L. Federwisch, San Jose, CA (US); Konstantin Tyapochkin, St. Petersburg (RU)

(73) Assignee: EMC Corporation, Hopkinton, MA (US)

( * ) Notice: Subject to any disclaimer, the term of this patent is extended or adjusted under 35 U.S.C. 154(b) by 117 days.

(21) Appl. No.: 13/723,110

(22) Filed: Dec. 20, 2012

(51) Int. Cl.
G06F 17/30 (2006.01)
(52) U.S. Cl.
CPC .............................. G06F 17/30008 (2013.01)
(58) Field of Classification Search
CPC ................. G06F 11/2064; G06F 2201/82
USPC ........................................ 707/634
See application file for complete search history.

(56) References Cited

U.S. PATENT DOCUMENTS

| | | | |
|---|---|---|---|
| 5,500,940 A * | 3/1996 | Skeie ............... | G06F 11/22 714/25 |
| 5,761,411 A * | 6/1998 | Teague ............. | G06F 11/004 714/42 |
| 5,761,441 A * | 6/1998 | Bennett ............ | 705/35 |
| 8,347,148 B1 * | 1/2013 | Harrison .......... | G06F 11/3409 714/47.2 |
| 8,874,863 B2 | 10/2014 | Mutalik et al. | |
| 2007/0234148 A1 * | 10/2007 | Fairhurst .......... | G06F 11/004 714/724 |
| 2007/0271219 A1 | 11/2007 | Agarwal et al. | |
| 2010/0049753 A1 * | 2/2010 | Prahlad ............ | G06F 17/30212 707/E17.01 |
| 2011/0016088 A1 * | 1/2011 | Spackman ........ | G06F 11/3428 707/637 |
| 2011/0246763 A1 | 10/2011 | Karnes | |
| 2012/0179652 A1 | 7/2012 | Glaude | |
| 2012/0278578 A1 | 11/2012 | Castillo et al. | |
| 2013/0006931 A1 | 1/2013 | Nelke et al. | |
| 2014/0067327 A1 * | 3/2014 | Jiang ............... | G05B 23/024 702/185 |

OTHER PUBLICATIONS

Mark Chamness, "Capacity Forecasting for Backup Storage," U.S. Appl. No. 13/334,479, filed Dec. 22, 2011, 18 pages.
Mark Chamness et al., "Automated End-to-end Sales Process of Storage Appliances of Storage Systems using Predictive Modeling," U.S. Appl. No. 13/538,993, filed Jun. 29, 2012, 30 pages.
Mark Chamness, "Capacity Forecasting in a Backup Storage Environment," Dec. 8, 2011, 9 pages.

(Continued)

*Primary Examiner* — Hosain Alam
*Assistant Examiner* — Robert F May
(74) *Attorney, Agent, or Firm* — Blakely, Sokoloff, Taylor & Zafman LLP

(57) ABSTRACT

Techniques for predicting data replication performance degradation are described. According to one embodiment, a method starts with receiving periodically data replication characteristics from a source storage and a target storage, the periodically received data replication characteristics being extracted from a replication process of the source storage replicating data to the target storage. The periodically received data replication characteristics are analyzed at a replication management server communicatively coupled with the source storage and the target storage, and a predictive modeling are applied. When the possibility of degradation of replication performance reaches a predetermined threshold, a notification is sent out.

18 Claims, 10 Drawing Sheets

(56) References Cited

OTHER PUBLICATIONS

Mark Chamness, "Capacity Forecasting in a Backup Storage Environment," 2011, 22 pages, EMC Corporation.
Final Office Action, U.S. Appl. No. 13/723,088, dated Sep. 10, 2014, 14 pages.
Non-Final Office Action, U.S. Appl. No. 13/723,088, dated May 30, 2014, 13 pages.
Non-Final Office Action, U.S. Appl. No. 13/723,088, dated Feb. 20, 2015, 11 pages.
Notice of Allowance, U.S. Appl. No. 13/723,088, dated Apr. 22, 2015, 28 pages.

* cited by examiner

METHOD AND APPARATUS FOR PREDICTING POTENTIAL REPLICATION PERFORMANCE DEGRADATION

CROSS-REFERENCE TO RELATED APPLICATIONS

This application is related to co-pending U.S. patent application Ser. No. 13/723,088, entitled "Method and Apparatus for Automatically Detecting Replication Performance Degradation,", filed Dec. 20, 2012, which is incorporated by reference herein in its entirety.

FIELD

Embodiments of the present invention relate generally to data replication systems. More particularly, embodiments of the invention relate to enhancing data replication performance.

BACKGROUND

Data storage is a critical component for computing. In a computing device, there is a storage area in the system to store data for access by the operating system and applications. In a distributed environment, additional data storage may be a separate device that the computing device has access to for regular operations. In an enterprise environment, the stored data in the storage area of the computing device or additional data storage often access one or more offsite storage devices as a part of a global disaster recover (DR) strategy to protect the entire organization by having one or more copies of data at offsite locations. Traditionally, backup applications are used to copy data to tapes, which are then physically shipped to offsite locations. This labor-intensive process is error prone, introduces security risks and is extremely slow for data recovery. A network-based alternative is to transfer stored data over a computer network. In this kind of environment, an onsite storage may be referred to as a source storage, and an offsite storage may be referred to as a target storage. For data protection purposes, it is important to make regular copies of data from a source storage to a target storage, and the process may be referred to as data replication.

The efficiency of data replication depends on various factors. Some factors are related to the source storage, such as the amount and characteristics of stored data at the source storage. Other factors are related to the computer network connecting the source storage and the target storage, such as bandwidth availability of the computer network used for transfer. Yet other factors are related to the amount and characteristics of stored data at the target storage. These factors are not fixed in time or predetermined by a deployed system architecture, rather, these factors may change over time and/or by system configuration modification. The changed factors often affect efficiency of data replication.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
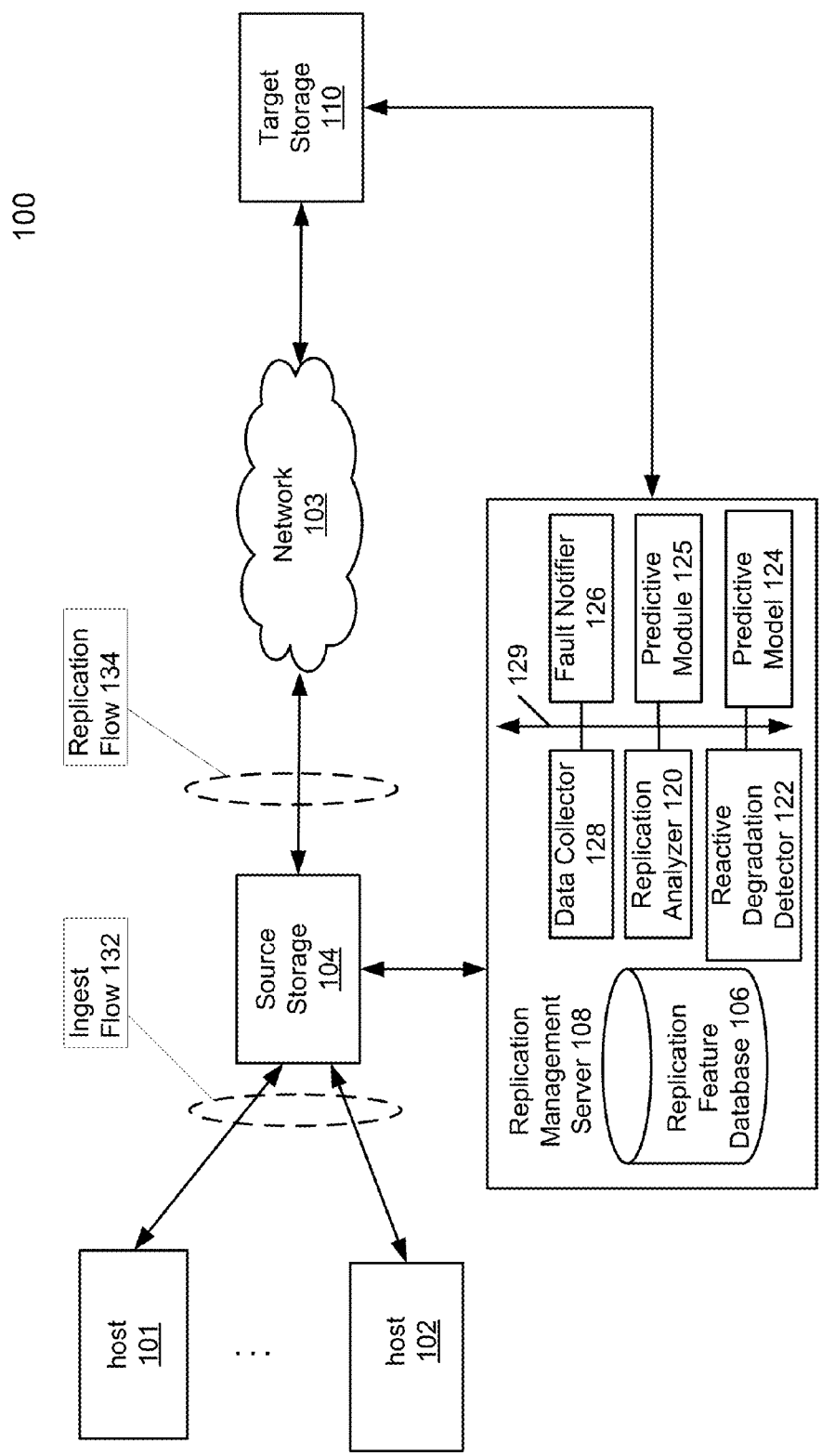
FIG. 1 is a block diagram illustrating a data replication system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. A dataset is a collection of data that is stored in a storage space in a variety of formats. Note the terms "data replication" and "replication" are used interchangeably within the specification.

According to some embodiments, a host is a computing device that is communicatively coupled with a source storage. The source storage may be communicatively coupled with a replication management server and a target storage over a network (e.g., the Internet, a storage network), where the replication management server coordinates a data replication process from the source storage to the target storage. Data replication is a process of copying datasets from one storage system to another storage system. A data replication may be a full replication that copies an entire dataset from a source storage to a target storage, or an incremental replication that copies only changed portion of the dataset from the source storage to the target storage. When only the changed portion of the dataset is copied, the target storage stitches together the changed portion of the dataset with a previous complete copy, and a new full replica can be reconstructed.

According to an embodiment, a replication management server receives periodically data replication characteristics (in this specification, the terms "data replication characteristics" and "replication characteristics" are used interchangeably) from a source storage and a target storage. The replication management server analyzes the periodically received replication characteristics against one or more rules in a reactive degradation detector, which is either stored at the replication management server or stored in a system communicatively coupled with the replication management server. Then the replication management server sends a notification in response to one or more rules of the reactive degradation detector indicating that a data replication performance (DRP) degradation has been detected. In one embodiment, the notification is sent to an administrator of the source storage and/or the target storage involved in the data replication process. Then administrator can then review the notification and determine what corrective measure to take. In one embodiment, the corrective measure taken by the administrator is then fed back to the replication management server, which may use the information to determine the effectiveness of the one or more applied rules and update the one or more applied rules for future operations.

In some embodiments, the reactive degradation detector may include the implementation in a programming language including, but not limited to, PL/SQL, PL/Java, PL/Python, and PL/R. In some embodiments the programming language is executed within the database. In some embodiments, the reactive degradation detector may also implement machine learning algorithms including, but not limited to Naïve Bayes and Random Forests™ (Random Forests is believed to be a trademark of Messrs. Leo Breiman and Adele Cutler) that classify DRP degradation as occurring or not occurring. These are known by the persons skilled in the art as pattern recognition or classification algorithms.

In the embodiments above, the analysis is based on short term changes of replication characteristics and the notification is based on short-term changes of replication characteristics deemed causing DRP degradation that either will imminently affect replication efficiency or have already broken a normal replication process. Yet replication characteristics also change over a longer term. These changes likely do not imminently affect replication efficiency and a replication process can continue without an immediate corrective measure. Yet, over time, replication efficiency degrades due to these changes. According to some embodiments, a replication management server receives periodically replication characteristics from a source storage and a target storage. The replication management server analyzes the periodically received replication characteristics and predicts a possibility of degradation of DRP by applying a predictive model to the periodically received replication characteristics. Then the replication management server sends a notification in response to the possibility of degradation of DRP reaching a predetermined threshold so that a corrective measure can be performed before the predicted degradation of DRP occurs. In one embodiment, the notification is sent to an administrator of the source storage and/or the target storage involved in the data replication process. Then the administrator can then review the notification and determine what corrective measure to take. In one embodiment, the corrective measure taken by the administrator is then fed back to the replication management server, which may use the information to determine the effectiveness of the predictive modeling. In one embodiment, the correct measure taken may be reconfiguration of the source storage and the target storage pairing, so that only a portion of the source storage is paired with the existing target storage while the other portion of the source storage is paired with one or more additional target storages.

System Configuration

FIG. 1 is a block diagram illustrating a data replication process according to one embodiment of the invention. Referring to FIG. 1, system 100 includes, but is not limited to, one or more hosts 101-102 communicatively coupled to source storage 104, replication management server 108 and target storage 110 over network 103. Hosts 101-102 may be any type of hosts such as a server, a personal computer (e.g., desktops, laptops, and tablets), a "thin" client, a personal digital assistant (PDA), a Web enabled system, a gaming device, a media player, or a mobile phone (e.g., Smartphone), etc. Network 103 may be any type of network such as a local area network (LAN), a wide area network (WAN) such as Internet, a corporate intranet, a metropolitan area network (MAN), a storage area network (SAN), a bus, or a combination thereof, wired and/or wireless.

Replication management server 108 manages replication processes between source storage 104 and target storage 110 and it is communicatively coupled with both source storage 104 and target storage 110. In one embodiment, replication management server 108 contains a data collector 128. Data collector 128 receives periodically replication characteristics from source storage 104 and/or target storage 110. Data collector 128 receives replication characteristics by periodically polling source storage 104 and/or target storage 110 in one embodiment. In another embodiment, source storage 104 and/or target storage 110 push the data to replication management server 108 periodically. The received replication characteristics may be saved in a replication feature database 106. In one embodiment, replication feature database 106 is a part of replication management server 108. In another embodiment, replication feature database 106 is in a separate system communicatively coupled with replication management server 108. Regardless of the relative location of replication feature database 106, functional modules within replication management server 108 have access to replication feature database 106. Replication feature database 106 may contain replication characteristics from multiple pairs of source storages and target storages.

Replication feature database 106 contains data collected relating to replication characteristics. For example but not limiting, replication feature database 106 may contain characteristics of ingest flow 132 such as data amount and data arrival rate from hosts 101 and 102 to source storage 104. Replication feature database 106 may also contain characteristics of replication flow 134 such as data amount and data transfer rate from source storage 104 to target 110. In addition, replication feature database 106 may contain characteristics of network 103 such as the effective data transfer rates at different times of a day. Furthermore, replication feature database 106 may contain characteristics of source storage 104 and target storage 110 such as deduplication characteristics. Note various replication characteristics discussed herein are illustrated for examples only and other replication characteristics can be collected and stored as necessary.

Data collector 128 may be communicatively coupled with several other modules within or outside of replication management server 108, including replication analyzer 120, reactive degradation detector 122, predictive model 124, predictive module 125, and fault notifier 126 via interconnect 129, which may be a bus connection in one embodiment. Replication analyzer 120 analyzes data collected by data collector 128 and it interacts with reactive degradation detector 122 to apply one or more rules within reactive degradation detector 122 to determine whether or not a DRP degradation has been detected. Similarly, replication analyzer 120 may also analyze data collected by data collector 128 and interact with predictive module 125, which applies predictive model 124 to predict a possibility of degradation of DRP. The detection and/or prediction of degradation of DRP by replication analyzer 120 are then fed to fault notifier 126, which sends out notification about the need of immediate correction (when analyzing reactive rule 122 indicates so) or preventative correction (when predictive module 125 indicates so).

A notification from fault notifier 126 may be sent to an administrator of at least one of source storage 104 and target storage 110 in one embodiment. In another embodiment, the notification may be sent to a manufacturer of storage 104 and/or target storage 110 when the administrator of source storage 104 and target storage 110 agrees to let the manufacturer to manage the data replication process or provide real-time support. A notification from fault notifier 126 may also generate a service ticket to the manufacturer of storage 104 and/or target storage 110, when immediate correction is needed. Note that one or more modules, including data collector 128, replication analyzer 120, reactive degradation detector 122, predictive model 124, predictive module 125, and fault notifier 126 may be integrated into one or more modules in different implementations. These modules may contain their dedicated processor units or several modules may share a single processor unit. In addition, in some embodiments, only detection or prediction of DRP degradation function is implemented, in which case modules/functionalities related to the unimplemented feature may not be built in replication management server 108.

Both source storage 104 and/or target storage 110 may represent any type of server or cluster of servers. For example, source storage 104 and target storage 110 may be a storage server used for any of various different purposes, such as to provide multiple users with access to shared data and/or to back up mission critical data. Source storage 104 and target storage 110 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Source storage 104 and target storage 110 may have a distributed architecture, or all of its components may be integrated into a single unit. Note source storage 104 and target storage 110 may have different replication performance characteristics even when they have similar architecture. Also, source storage 104 and target storage 110 may be implemented as part of an archive and/or backup storage system such as a de-duplication storage system available from EMC® Corporation of Hopkinton, Mass.

Figure 2:
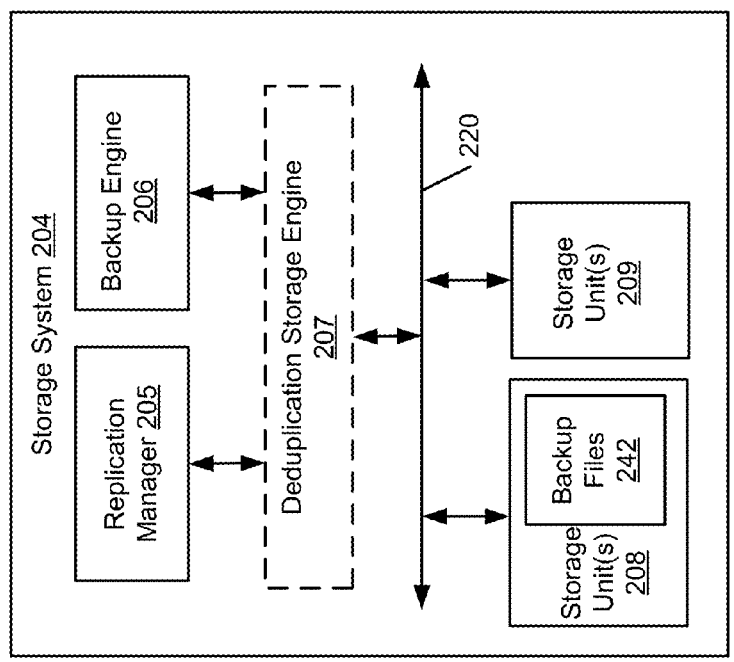
FIG. 2 is a block diagram illustrating a storage system according to one embodiment of the invention.

FIG. 2 is a block diagram illustrating a storage system according to one embodiment of the invention. In one embodiment, one or both source storage 104 and target storage 110 of FIG. 1 are configured similarly to storage system 204. In one embodiment, backup storage system 204 may include, but is not limited to, deduplication storage engine 207, and one or more storage units 208-209 communicatively coupled to each other. Storage units 208-209 may be implemented locally (e.g., single node operating environment) or remotely (e.g., multi-node operating environment) via interconnect 220, which may be a bus and/or a network. In one embodiment, one of the storage units 208-209 operates as an active storage to receive and store external or fresh user data, while the other storage unit operates as a target storage unit to periodically archive data from the active storage unit according to an archiving policy or scheme. Storage units 208-209 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 208-209 may also be combinations of such devices. In the case of disk storage media, the storage units 208-209 may be organized into one or more volumes of Redundant Array of Inexpensive Disks (RAID). Backup files 242 represent files stored in storage units 208.

Storage system 204 includes replication manager 205 to coordinate with other storage systems and one or more replication management server in a replication process. Storage system 204 may also include backup engine 206. Backup engine 206 coordinates with storage units 208-209 and deduplication storage engine 207 to run various backup operations. Backup engine 206 may perform both backup and restore functions. Note that in one embodiment, backup engine 206 may be implemented in a separate system (e.g., a backup application server) outside of storage system 204. In response to a data file to be stored in storage units 208-209, optional deduplication storage engine 207 is configured to segment the dataset into multiple segments (also referred to as data chunks or simply chunks) according to a variety of segmentation policies or rules. Deduplication storage engine 207 only stores a segment in a storage unit if the segment has not been previously stored in the storage unit. In the event that a segment has been previously stored, metadata stores information enabling the reconstruction of a file using the previously stored segment. As a result, segments of datasets are stored in a deduplicated manner, either within each of storage units 208-209 or across at least some of storage units 208-209. Datasets stored in the storage units may be stored in a compressed form (e.g., lossless compression: Huffman coding, Lempel-Ziv Welch coding; delta encoding: a reference to a segment plus a difference; sub-segmenting: a list of subsegments or references to subsegments, etc.). In one embodiment, different storage units may use different compression methods (e.g., main or active storage unit from other storage units, one storage unit from another storage unit, etc.).

The metadata may be stored in at least some of storage units 208-209, such that datasets can be accessed independent of another storage unit. Metadata of each storage unit includes enough information to provide access to the datasets it contains. When an active storage unit fails, metadata contained in another storage unit may be utilized to recover the active storage unit. When one storage unit is unavailable (e.g., the storage unit has failed, or is being upgraded, etc.), the system remains up to provide access to any dataset not stored in the failed storage unit. When a dataset is deleted, the metadata associated with the datasets in the system is updated to reflect that the dataset has been deleted.

In one embodiment, the metadata information includes a dataset identifier, a storage unit where the segments associated with the dataset identifier are stored, reconstruction information for the dataset using the segments, and any other appropriate metadata information. In one embodiment, a copy of the metadata is stored on a storage unit for datasets stored on a storage unit so that datasets that are stored on the storage unit can be accessed using only the information stored on the storage unit. In one embodiment, a main set of metadata information can be reconstructed by using information of other storage units associated with the backup storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units).

In one embodiment, the storage system as shown in FIG. 2 may be used as a tier of storage in a storage hierarchy that comprises other tiers of storage. One or more tiers of storage in this hierarchy may utilize different kinds of storage devices and/or may be optimized for different characteristics such as random update performance. Datasets are periodically moved among the tiers based on data management policies to achieve a cost-effective match to the current storage requirements of the datasets. For example, a dataset may initially be stored in a tier of storage that offers high performance for reads and writes. As the dataset ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Figure 3:
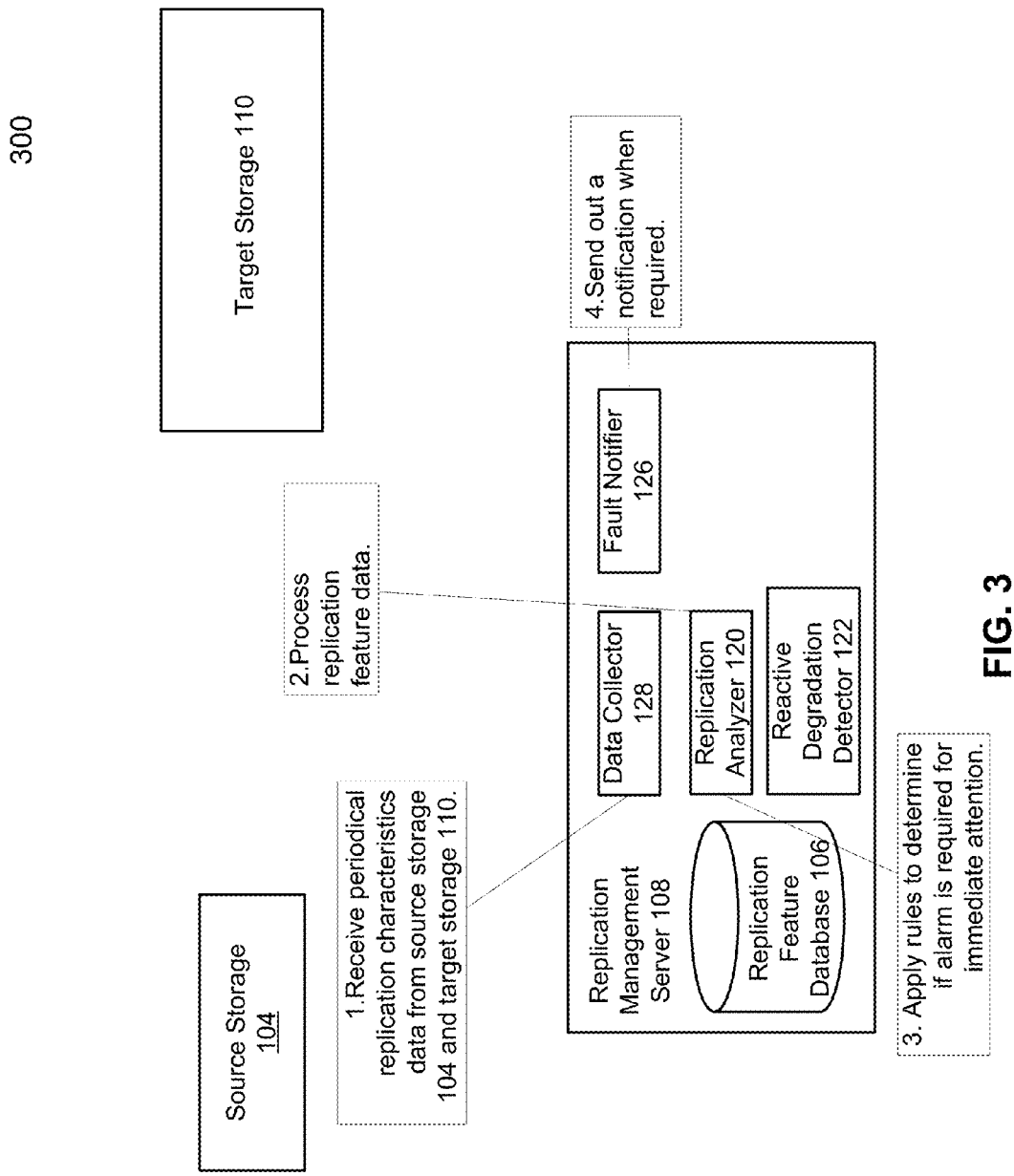
FIG. 3 is a block diagram illustrating an automatic data replication performance (DRP) degradation detection process according to one embodiment of the invention.

Embodiments of Automatic Data Replication Performance (DRP) Degradation Detection Process FIG. 3 is a block diagram illustrating an automatic data replication performance (DRP) degradation detection process according to one embodiment of the invention. Task boxes 1 to 4 illustrate the order in which operations are performed according to one embodiment of the invention. System 300 is similar to system 100 in FIG. 1 and the same or similar references indicate elements or components having the same or similar functionalities. The connectivity between various entities and modules within entities are omitted in FIG. 3 to leave space to discuss the DRP degradation detection process more clearly. The process starts at replication management server 108. At task box 1, replication management server 108 receives periodically replication characteristic data from source storage 104 and target storage 110. Data collector 128 receives replication characteristics by periodically polling source storage 104 and target storage 110 in one embodiment. In another embodiment, source storage 104 and target storage 110 push the data to replication management server 108 periodically. In some embodiments, replication management server 108 receives periodically replication characteristic data from source storage 104 or target storage 110. The collected data may then be saved at replication feature database 106. As discussed herein above, replication feature database 106 may contain data such as characteristics of ingest flow of source storage 104, replication flow from source storage 104 to target storage 110, network 103 (not shown in FIG. 3), and deduplication of source storage 104 and target storage 110.

At task box 2, replication analyzer 120 analyzes data in replication feature database 106. In one embodiment, it may extract data pertinent to a full set of particular replication characteristics over a period of time. In another embodiment, it may extract data pertinent to only changed replication characteristics data when the change is over a certain predetermined threshold. For example but not limiting, replication analyzer 120 may extract only changes of deduplication ratio of source storage 104 or target storage 110 when the change is over 50% (e.g., from 9× to less than 6×). The predetermined threshold can be set to zero, in which case, any changed replication characteristics data will be extracted. At task box 3, replication analyzer 120 applies rules within reactive degradation detector 122 to the extracted characteristics data.

Reactive degradation detector 122 may include the implementation in a programming language including, but not limited to, PL/SQL, PL/Java, PL/Python, and PL/R. In some embodiments the programming language is executed within the database. In some embodiments, the reactive degradation detector may also implement machine learning algorithms including, but not limited to Naïve Bayes and Random Forests™ (Random Forests is believed to be a trademark of Messrs. Leo Breiman and Adele Cutler) that classify DRP degradation as occurring or not occurring. These pattern recognition or classification algorithms may be stored in reactive degradation detector 122 and formulated as one or more rule that can be applied to the extracted characteristics data. For example but not limiting, a system administrator may turn on low bandwidth optimization in an attempt to improve performance. Replication analyzer 120 then retrieves DRP characteristics data including the changed low bandwidth optimization setting. Reactive degradation detector 122 recognizes that turning on low bandwidth optimization may cause repaid increase of pre-compression data volume at a source storage, thus it contains a rule stating that when turning on low bandwidth optimization causing 100% increase of pre-compression data volume after an hour, a DRP degradation is detected, and a message should send to fault notifier 126. The rules may be formulated based on pattern recognition of replication characteristics of source storage 104 and target storage 110 pair, from which the replication characteristics are collected (through machine learning algorithms for example). The rules may be also formulated based on pattern recognition of replication characteristics of a different source storage and a different target storage pair within or outside of replication management server 108. In addition, the rules may be updated as replication processes are performed in some embodiments.

In some embodiments reactive degradation detector 122 recognizes that data ingest increased by a factor of two, data compression factor decreased by a factor of two, and bandwidth throughput decreased by a factor of two, causing the replication lag to increase by a factor of eight. DRP degradation is detected, and a message should send to fault notifier 126.

Onward to task box 4, the fault notifier 126 sends out a notification when one or more applied rule indicating that a DRP degradation has been detected. The DRP degradation may affect data replication imminently or it may have already broken a normal replication process. In one embodiment, the notification may also indicate the severity of the DRP degradation, for example but not limiting, the notification may be an alarm with various severity levels including critical, major, or minor alarms. The notification may be sent to different parties by different means for different levels of DRP degradation. For a minor degradation (with minor alarm indication), the notification may be an email to the administrator of source storage 104 and/or target storage 110. For a major degradation (with major alarm indication), the notification may be an text message or an automatic call to a replication center in addition to notification to the administrator of source storage 104 and/or target storage 110. For a critical degradation (with critical alarm indication), the notification may further include a service request to the manufacturer of source storage 104 and/or target storage 110 to request fixing the issue immediately. Note a variety of notification techniques can be used based on severity of the issue and/or responsibility of various parties in connecting to the data replication process. Also note that in some embodiment, data collector 128, replication analyzer 120, reactive degradation detector 122, and fault notifier 126 may be integrated into one or more modules. In some embodiment, reactive degradation detector 122 is stored in a separate system communicatively coupled to replication management server 108. A single reactive degradation detector 122 may be shared among multiple replication management servers.

In one embodiment, after the notification triggers a corrective measure, the corrective measure taken is then saved in replication management server 108. The information may be used to update reactive degradation detector and/or adjust action by fault notifier 126 in the future. For example, in a reactive degradation detector, a 30% decrease of deduplication ratio of target storage 110 may be considered initially not an actionable DRP degradation event and only 50% decrease or more may trigger a minor alarm, yet the corrective measure eventually taken for a 50% decrease is the manufacturer of target storage 110 sending a crew to go offsite at target storage 110 to fix the problem. In this case, the alarm indication for the DRP degradation does not correctly reflect the severity of the degradation, thus the reactive degradation detector 122 needs to update its rule table and may consider a 30% decrease of deduplication ratio of target storage 110 an actionable DRP degradation event in need of corrective measure. Fault notifier 126 may be updated so that a critical alarm is sent out when a 50% decrease of deduplication ratio of target storage 110 happens. Thus, different notifications may be triggered based on different characteristics or thresholds.

Figure 4:
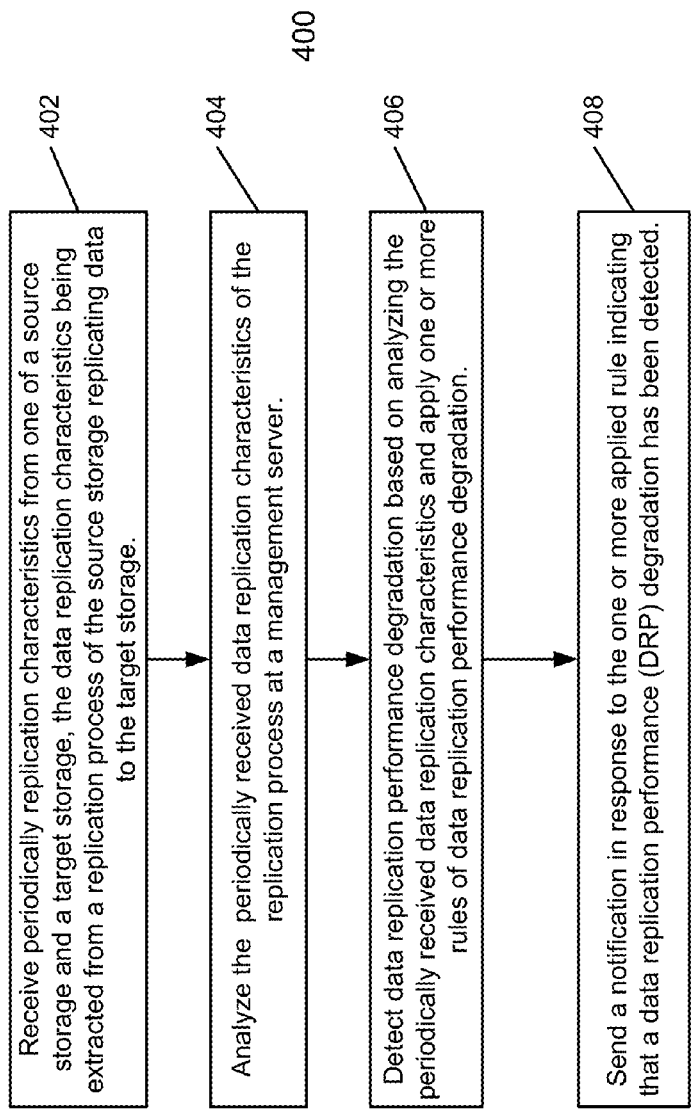
FIG. 4 is a flow diagram illustrating an automatic DRP degradation detection process according to one embodiment of the invention.

FIG. 4 is a flow diagram illustrating an automatic DRP degradation detection process according to one embodiment of the invention. Process 400 may be performed by replication management server 108. At reference 402, periodically data replication characteristics from a source storage and/or a target storage are received. The characteristics data may be received in a form of automatic reporting messages or emails in a variety of data serialization formats such as extensible markup language (XML) or YAML ("YAML (Yet Another Makeup Language) Ain't Markup Language"). The data replication characteristics are extracted from a replication process of the source storage replicating data to the target storage. The data replication characteristics may be received by periodically polling the source storage and the target storage in one embodiment. In another embodiment, the source storage and target storage push the data to a replication management server periodically. Note that in some embodiment, a replication management server receives periodically replication characteristic data only from the source storage or the target storage. Then at reference 404, the periodically received data replication characteristics of the replication process is analyzed. In one embodiment, pertinent data relate to the replication process are extracted for analysis. In another embodiment, only a portion of pertinent data relate to the replication process are extracted (for example, only changed replication characteristics are extracted) for analysis.

Onward to reference 406, the method detects data replication performance degradation based on analyzing the periodically received data replication characteristics and applying one or more rule for data replication performance degradation detection. Then at reference 408 a notification is sent out in response to the one or more applied rules indicating that a DRP degradation has been detected. As discussed herein above, the notification may be sent to different parties by different means for different levels of degradation, which may be specified by the rules. In one embodiment, optionally the corrective measure taken to correct the DRP degradation is fed back to update at least one of reactive degradation detector or notification process.

Figure 5:
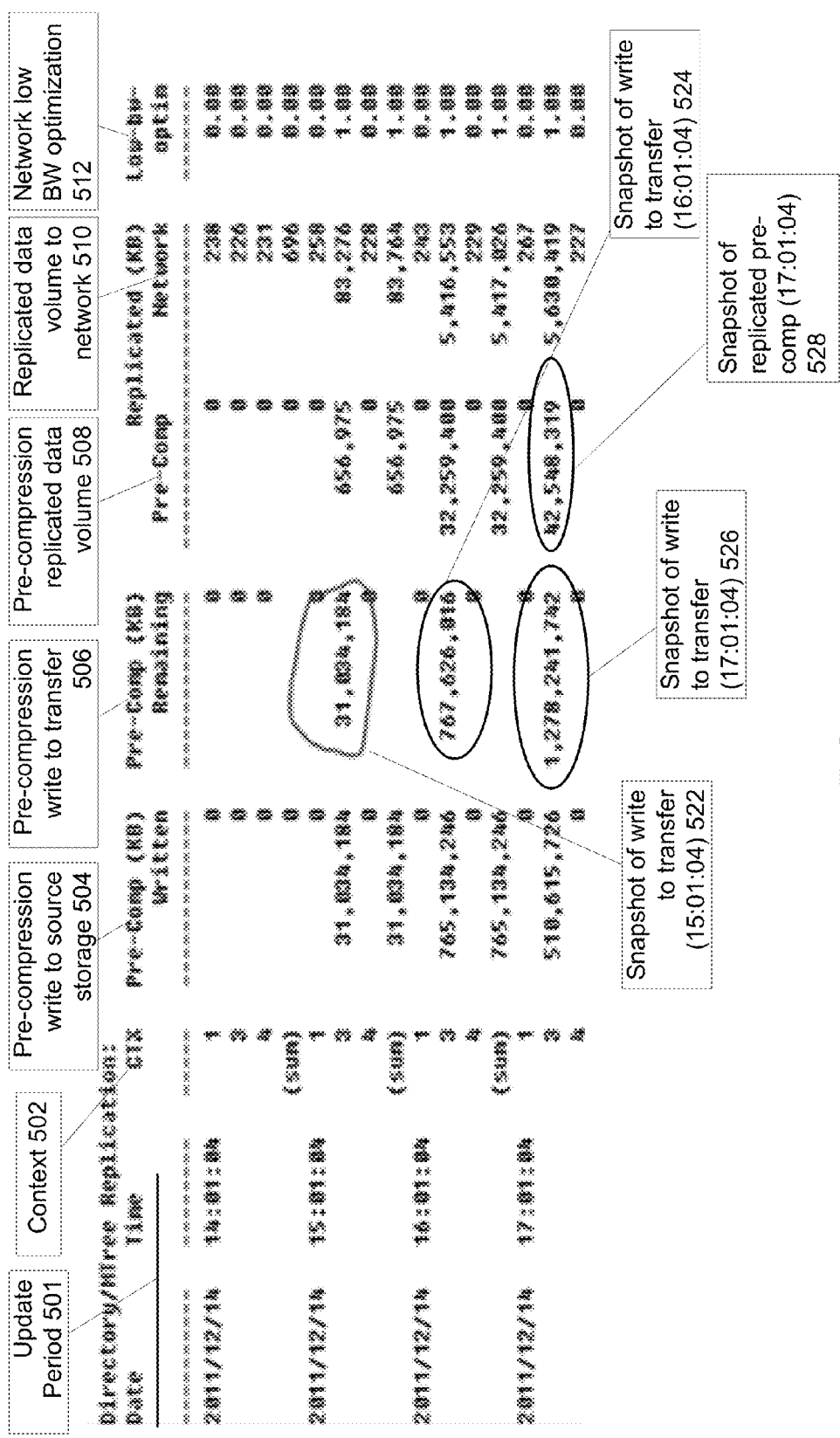
FIG. 5 is a diagram illustrating a snapshot of data replication characteristics according to one embodiment of the invention.

FIG. 5 is a diagram illustrating a snapshot of data replication characteristics according to one embodiment of the invention. The data replication characteristics are received periodically. As shown by reference 501, the data are received every hour at 01:04 pass an hour (14:01:04, 15:01:04, 16:01:04, and 17:01:04). CTX at reference 502 is short for context. Context is a term of art describing a pair of a source storage and a target storage. A context is numbered with identification (ID), and in this example, data replication characteristics of contexts 1, 3, 4 are collected. The column of pre-comp (KB) written at reference 504 shows pre-compression write to the source storage. Compression is a result of a deduplication process, thus pre-comp written records is an indication of the data volume of ingest flow written from one or more hosts to the source storage. The column of pre-comp (KB) remaining at reference 506 shows pre-compression data volume at the source storage remaining to be replicated. The column of replicated (KB) pre-comp at reference 508 shows pre-compression data being replicated thus it indicates a data volume that has already been replicated to from the source storage to a target storage. The column of replicated (KB) network at reference 510 shows replicated data volume going through a network between the source storage to a target storage. Note the data volume going through a network have gone through a deduplication process already, thus the data volumes in the column are significantly lower than the data volumes indicated in the pre-comp column at reference 508. The column of low-bw-optim at reference 512 shows the low bandwidth optimization is applied to a particular context at a particular time.

FIG. 5 shows a number of data replication characteristics. At reference 522, which is a snapshot of write to transfer at 15:01:04, context 3 has 31,034,184 KB 31 GB bytes remain to be replicated. At the next periodical update one hour later at reference 524, context 3 has 767,626,016 KB≈768 GB bytes remain to be replicated. One more hour later at reference 526, context 3 now has 1,278,241,742 KB≈1.3 TB bytes remain to be replicated. The remaining to be replicated data volume increased by 1,278,241,742/31,034,184≈41 times within two hour interval. Yet, the pre-compression replicated data volume at 17:01:04 is only 42,548,319≈43 GB as shown at reference 528. Since there is a large volume of data ingest for context 3 within the period between 15:01:04 and 17:01:04 yet replicated data volume has not increased proportionally to data ingest flow, likely there is DRP degradation and a rule within a reactive degradation detector should apply and a fault notification should be sent out so that an administrator of the source storage or target storage may take proper corrective measure.

Embodiments of DRP Degradation Prediction Process

The embodiments of automatic DRP degradation detection process discussed herein above improve data replication efficiency as it allows an administrator of a source storage or a target storage to take corrective measures at the time abnormal data replication characteristics are detected. The detection alerts the administrator conditions that require immediately attention—the conditions may go unnoticed without an automatic detection process. The in-time reactive response is necessary for a highly efficient replication process, but further improvement is possible. A DRP degradation prediction process, which calculates the probability of potential DRP degradation in the future, will help an administrator of a source storage or a target storage to proactively plan and take corrective action before a DRP degradation occurs.

Figure 6:
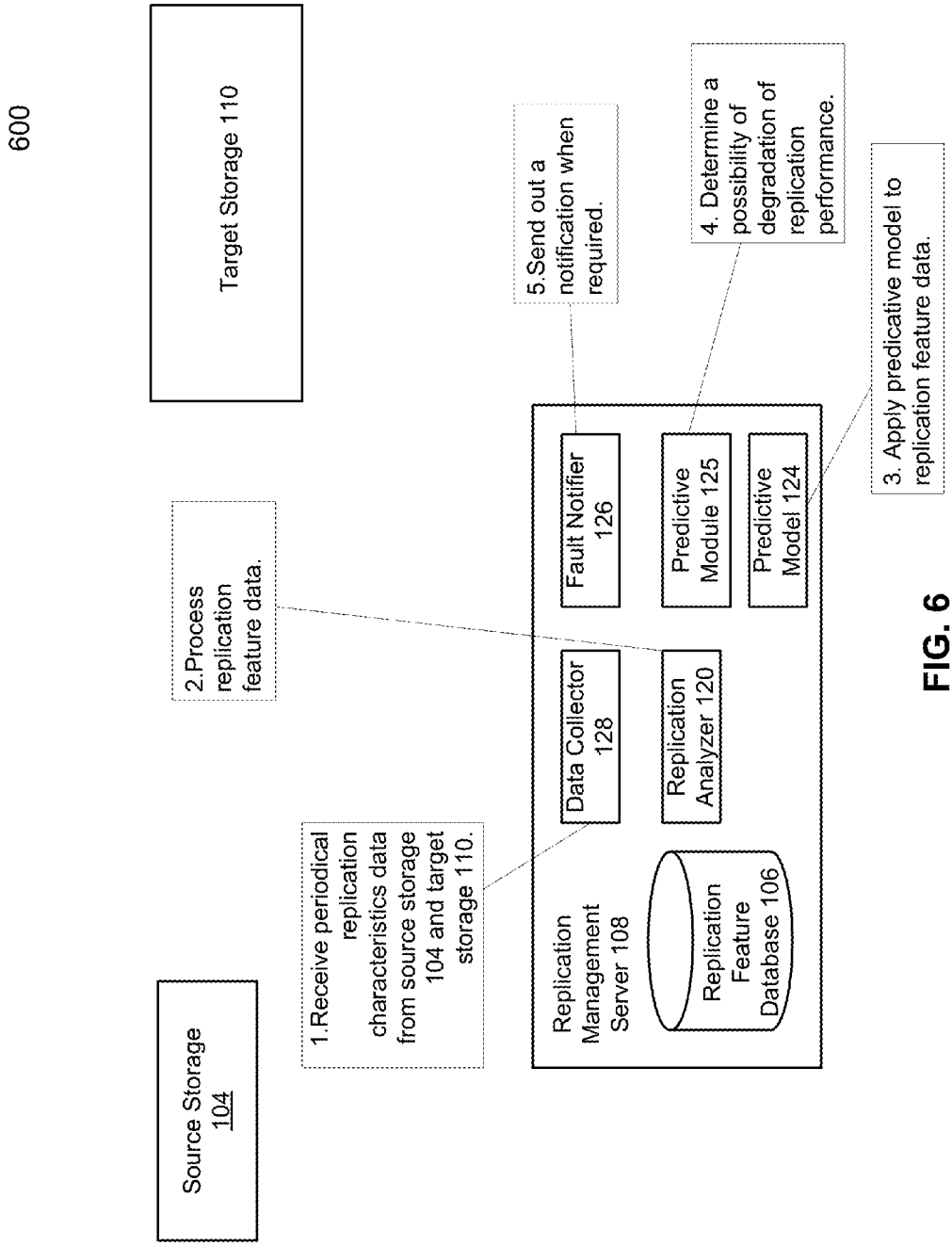
FIG. 6 is a block diagram illustrating a DRP degradation prediction process according to one embodiment of the invention.

FIG. 6 is a block diagram illustrating a DRP degradation prediction process according to one embodiment of the invention. Task boxes 1 to 4 illustrate the order in which operations are performed according to one embodiment of the invention. System 600 is similar to system 100 in FIG. 1 and the same or similar references indicate elements or components having the same or similar functionalities. The connectivity between various entities and modules within entities are omitted in FIG. 6 to leave space to discuss the incremental backup process more clearly.

The process starts at replication management server 108. At task box 1, replication management server 108 receives periodically replication characteristic data from source storage 104 and target storage 110. Data collector 128 receives replication characteristics by periodically polling source storage 104 and target storage 110 in one embodiment. In another embodiment, source storage 104 and target storage 110 push the data to replication management server 108 periodically. In some embodiment, replication management server 108 receives periodically replication characteristic data only from source storage 104 or target storage 110. The collected data may then be saved at replication feature database 106. As discussed herein above, replication feature database 106 may contain data such as characteristics of ingest flow of source storage 104, replication flow from source storage 104 to target storage 110, network 103 (not shown in FIG. 6), and deduplication of source storage 104 and target storage 110.

At task box 2, replication analyzer 120 analyzes data in replication feature database 106. In order to make predication of future DRP degradation, replication analyzer 120 may analyzes significant amount of historical data. In one embodiment, instead of processing collected data replication characteristics within the last 12 hours (as a DRP degradation detection process may do), replication analyzer 120 may analyzes data replication characteristics in the last two weeks to two months in one embodiment. Replication analyzer 120 analyzes the historical data and passes them over to predictive module 125. Note the time period of past data collected for historical data analysis may be predetermined, and it can vary widely based on storage system characteristics and operational need by an administrator. The time period of past data collected for historical data analysis may also be updated automatically by the storage system or manually by an administrator of the source or target storage system.

At task box 3, the processed replication feature data is applied to predictive model 124. A number of predictive models may be used. The detail of predictive models is discussed herein below in discussion relating to FIG. 7. Onward to task box 4, predictive module 125 computes a possibility of DRP degradation based on the predictive modeling of predictive model 124. Then at task box 5, the fault notifier 126 sends out a notification when predictive model 124 indicates that the possibility of DRP degradation has reached a predetermined threshold. In one embodiment, the notification may also indicate the degree of the possibility of DRP degradation, for example but not limiting, the notification may be an alarm with various severity levels including critical, major, or minor alarms/alerts to various degrees of possibility of DRP degradation. The notification may be sent to different parties by different means for different levels of degradation. For a low possibility of DRP degradation (with minor alarm/alert indication), the notification may be an email to the administrator of source storage 104 and/or target storage 110. For a higher possibility of DRP degradation (with major alarm/alert indication), the notification may be an text message or an automatic call to a replication center in addition to notification to the administrator of source storage 104 and/or target storage 110, where the replication center is the central location of IT management of the enterprise. For a near certainty of DRP degradation (with a critical alarm indication), the notification may further include a service request to the manufacturer of source storage 104 and/or target storage 110 to request fixing the issue immediately.

Note a variety of notification techniques can be used based on severity of the issue and/or responsibility of various parties in connecting to the data replication process. Also note that in some embodiment, data collector 128, replication analyzer 120, predictive module 125, predictive model 124, and fault notifier 126 may be integrated into one or more modules. In some embodiment, predictive model 124 is stored in a separate system communicatively coupled to replication management server 108. A single predictive model 124 may be shared among multiple replication management servers.

While in some embodiments a change of configuration is sufficient to prevent a potential DRP degradation, in other embodiments extra hardware is required to forestall the potential DRP degradation as existing hardware may not be sufficient to sustain existing/changing replication requests. In one embodiment, an existing source storage and target storage pair may be split into two or more source—target storage pairs when the possibility of DRP degradation reaches a certain threshold. The threshold for adding replication resources may be higher than the threshold for error notification only. After the split, each new pair processes only a portion of data replication task of the pre-split source—target storage pairs.

In one embodiment, after the notification triggers a corrective measure, the corrective measure taken is saved in replication management server 108. The information may be used to update predictive model 124 and/or adjust action by fault notifier 126 in the future.

Figure 7:
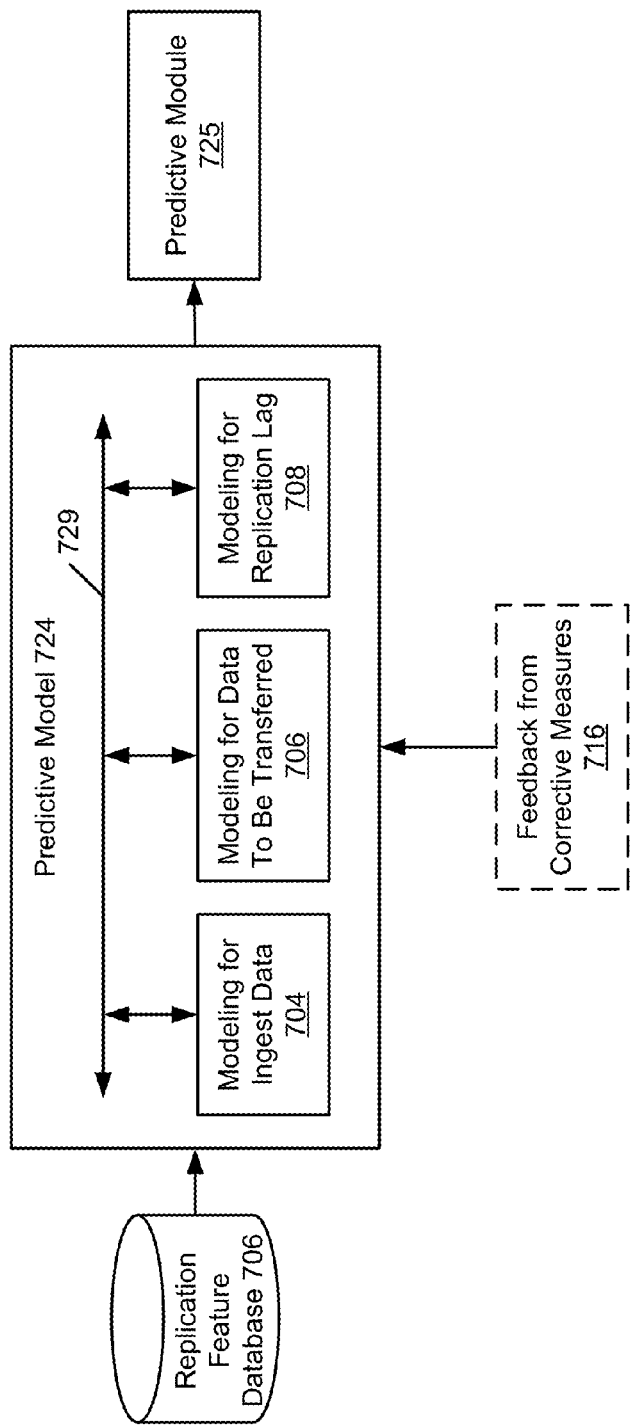
FIG. 7 is a block diagram illustrating a predictive modeling for a DRP degradation prediction process according to an embodiment of the invention.

FIG. 7 is a block diagram illustrating a predictive modeling for a DRP degradation prediction process according to an embodiment of the invention. In this example, several models are established for different aspects of a data replication process. Replication feature database 706 contains data collected relating to replication characteristics, and it is similar to replication feature database 106 illustrated in FIG. 1 and replication feature database 706 may receive periodically data replication characteristics. Predictive model 724 then applies pertinent data within replication feature database 706. For predictive modeling, large amount of data collected relating to replication characteristics are utilized. Instead of applying replication characteristics within previous hours using in DRP degradation detection in some embodiments, predictive modeling applying replication characteristics within previous days, weeks, even months. In one embodiment, replication characteristics over 24 hours are referred to as historical data. It may be a sufficient amount of data to predict a DRP degradation which warrants immediate attention. In some embodiments, three weeks are referred to as historical data. A longer timeframe (more data points) may be required to detect a gradual DRP degradation.

Predictive model 724 contains modeling for ingest data 704, modeling for data to be transferred 706, and modeling for replication lag 708. These modeling blocks are communicatively coupled via interconnect 729, which may be a bus connection in one embodiment. Interconnect 729 is useful when a modeling result of one modeling block is needed for modeling of another modeling block. For example, modeling for replication lag 708 may need modeling results of modeling for ingest data 704 and modeling for data to be transferred 706. The results of predictive model 724 are passed to predictive module 725 to predict possibility of DRP degradation. As discussed herein above, in some embodiment, the corrective measures taken based on the prediction at reference 716 may be fed back to predictive models such as predictive model 724 so that one or more models can be adjusted to better predict DRP degradation in the future. Note even though three modeling boxes are illustrated in FIG. 7, less or more modeling boxes can be implemented within predictive model 724. Also, one or more modeling modules may be integrated in different embodiments.

Modeling for inflow data 704 is a predictive model for one or more pairs (also referred to as context) of source storages and target storages. In one embodiment, modeling for ingest data 704 may use ingest data from last two months to predict ingest data for the next two weeks of a given context. Often ingest data of a context has cyclic structure and the cyclic structure for the next two weeks may be estimated by a sum of cosine functions using ingest data of the last two months of the same context.

Modeling for data to be transferred 706 is a predictive model for one or more contexts. In one embodiment, the predictive model predicts data to be transferred in a period, given a known pattern of ingest data. In one embodiment, the random forest algorithm may be used to model the data to be transferred, based on the known pattern of ingest data, the known pattern of replicated data transferred to a target storage of a context, and data to be transferred in a previous period.

Similar to the other two modeling boxes above, modeling for replication lag 708 is a predictive model for replication lag for one or more contexts. Replication lag is the difference between the timestamp of the most recent container (container is a storage unit of data within a storage system) on the source storage and the target storage of a context. Replication lag increases when replication duration increases, and it may increase to a situation where replication of a context cannot complete. Replication lag can be predicted using a combination of a cyclic model and a linear model where a set of linear regressions is calculated using replication lag of a previous period and the modeling result of data to be transferred. Note while only three modeling boxes are illustrated, other modeling can be implemented in other embodiments for other replication characteristics, such as historical data for ingest data rate of a source storage, the data amount sent from a source storage to a target storage, a link speed between a source storage and a target storage, deduplication characteristics of a source storage, and deduplication characteristics of a target storage.

Figure 8:
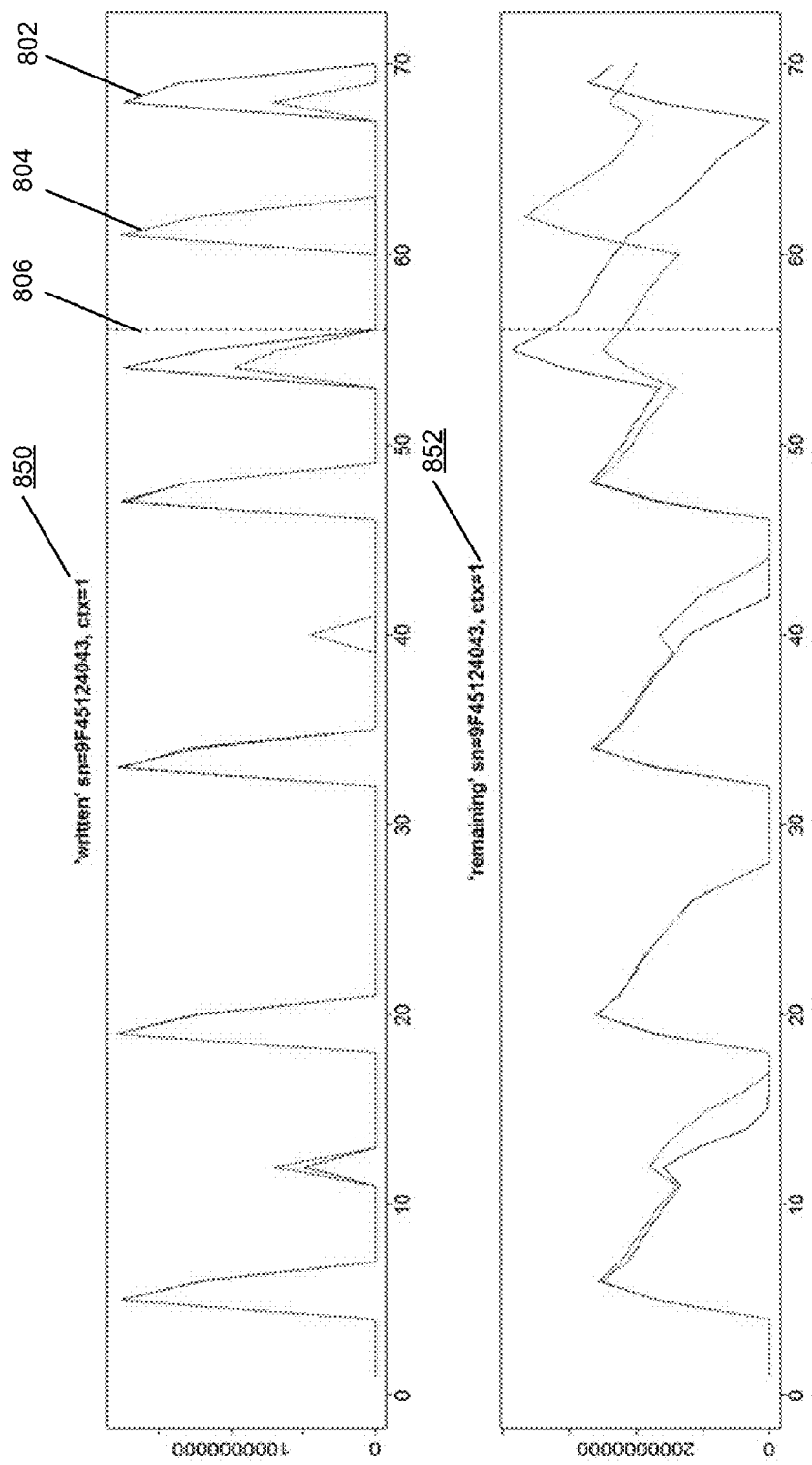
FIG. 8 is a diagram illustrating a snapshot of predictive modeling results according to one embodiment of the invention.

FIG. 8 is a diagram illustrating a snapshot of predictive modeling results according to one embodiment of the invention. In this example, a predictive modeling is applied to a pair of source storage and target storage, identified by serial number 9F45124043 and context 1. Reference 850 is a snapshot of predictive modeling results for pre-compression write to the source storage and reference 852 is a snapshot of predictive modeling results for pre-compression data volume at the source storage remaining to be replicated. The line of reference 802 is the real data of pre-compression write, and the line of reference 804 is the predicted data of pre-compression write based on historical data. Prior to reference 806, the predicted data is trained based on the real data, and after reference 806, the predictive data is used to predict the real data. The two set of data are compared to determine the error of the forecast. Experiment shows that a model assigning greater weight to recent data and less weight to older data makes a predictive modeling closer to real data.

Figure 9:
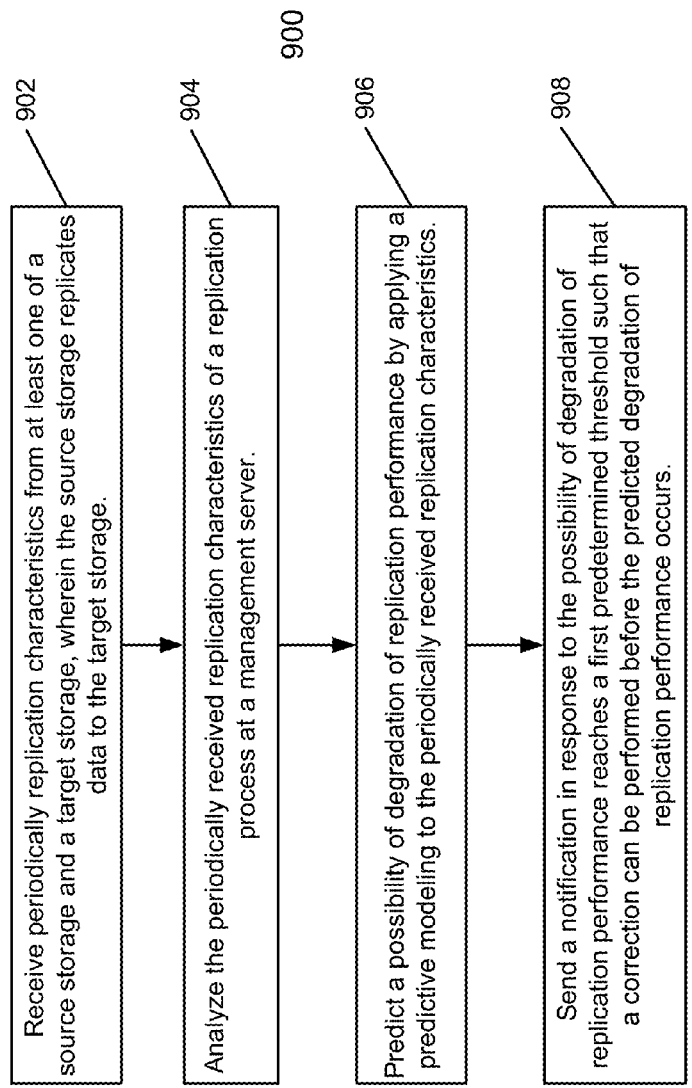
FIG. 9 is a flow diagram illustrating a DRP degradation prediction process according to one embodiment of the invention.

FIG. 9 is a flow diagram illustrating a DRP degradation prediction process according to one embodiment of the invention. Process 900 may be performed by replication management server 108. At reference 902, periodically data replication characteristics from a source storage and a target storage are received. The data replication characteristics are extracted from a replication process of the source storage replicating data to the target storage. The data replication characteristics may be received by periodically polling the source storage and the target storage in one embodiment. In another embodiment, the source storage and target storage push the data to a replication management server periodically. In some embodiments, the received periodically replication characteristic data are from a source storage or a target storage only. Then at reference 904, the periodically received data replication characteristics of the replication process are analyzed. In one embodiment, all pertinent data relate to the replication process are extracted for analysis. In another embodiment, only a portion of pertinent data relate to the replication process are extracted (for example, only changed replication characteristics are extracted) for analysis.

At reference 906, a predictive modeling is applied against the periodically received data replication characteristics, as well as replication history data. Then a notification is sent out in response to the possibility of DRP degradation reaches a predetermined threshold at reference 908 such that a corrective measure can be performed before the predicted DRP degradation occurs. As discussed herein above, the notification may be sent to different parties by different means for different levels of possibility of DRP degradation. In one embodiment, optionally the corrective measure taken to correct the DRP degradation is fed back to update the predictive model or notification process.

Figure 10:
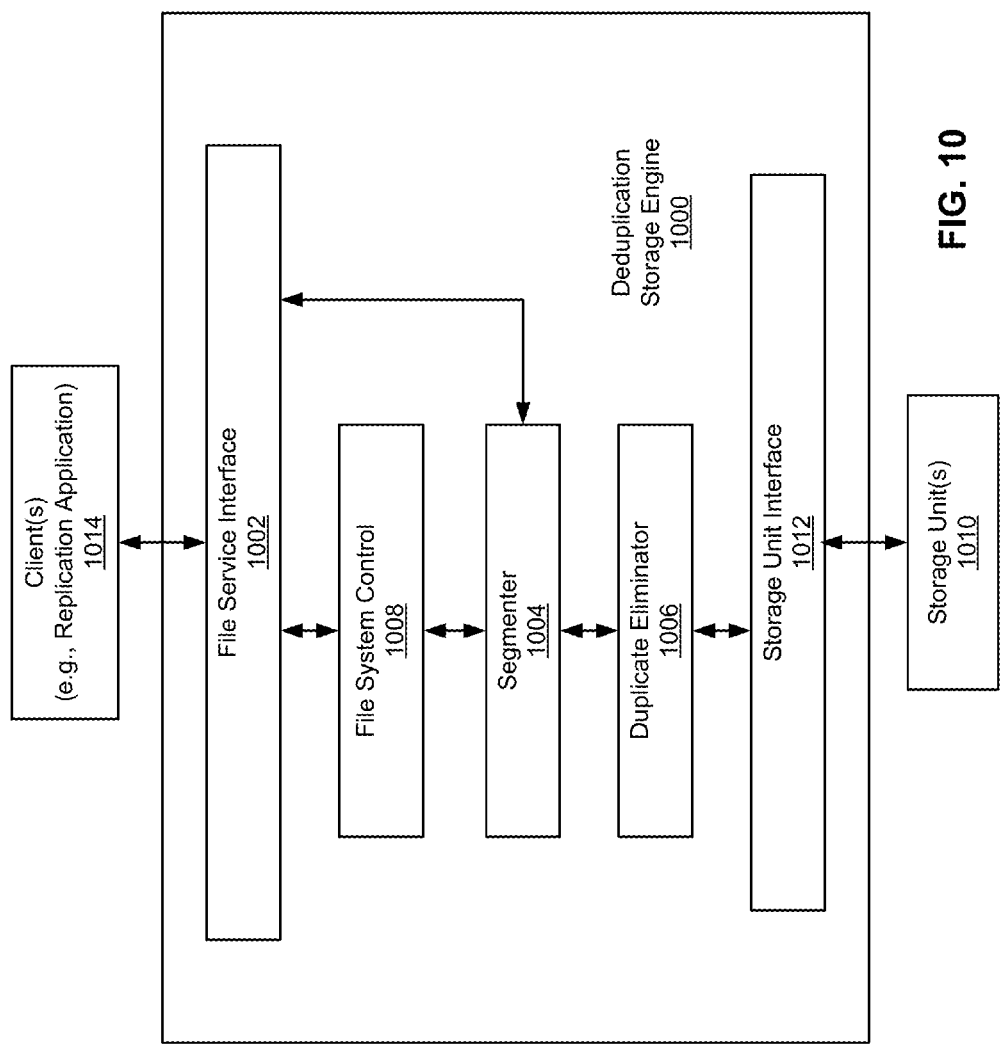
FIG. 10 is a block diagram illustrating a segment storage engine according to one embodiment of the invention.

FIG. 10 is a block diagram illustrating a segment storage engine according to one embodiment of the invention. For example, deduplication storage engine 1000 may be implemented as part of a deduplication storage system as described above, such as deduplication storage engine 107 of FIG. 1. Referring to FIG. 10, in one embodiment, deduplication storage engine 1000 includes file service interface 1002, segmenter 1004, duplicate eliminator 1006, file system control 1008, and storage unit interface 1012. Deduplication storage engine 1000 receives a file or files (or dataset(s)) via file service interface 1002, which may be part of a file system namespace of a file system associated with the deduplication storage engine 1000. The file system namespace refers to the way files are identified and organized in the system. An example is to organize the files hierarchically into directories or folders. File service interface 1002 supports a variety of protocols, including a network file system (NFS), a common Internet file system (CIFS), and a virtual tape library interface (VTL), etc.

The file(s) is/are processed by segmenter 1004 and file system control 1008. Segmenter 1004 breaks the file(s) into variable-length segments based on a variety of rules or considerations. For example, the file(s) may be broken into segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, file system control 1008 processes information to indicate the segment(s) association with a file. In some embodiments, a list of fingerprints is used to indicate segment(s) associated with a file. File system control 1008 passes segment association information (e.g., representative data such as a fingerprint) to an index (not shown). The index is used to locate stored segments in storage units 1010 via storage unit interface 1012. Duplicate eliminator 1006 identifies whether a newly received segment has already been stored in storage units 1010. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 1010 that make up the file. Segments are then packed by a container manager (not shown) into one or more storage containers stored in storage units 1010. The deduplicated segments may be further compressed using a variation of compression algorithms, such as a Lempel-Ziv algorithm before being stored.

When a file is to be retrieved (for replication application 1014 for example), file service interface 1002 is configured to communicate with file system control 1008 to identify appropriate segments stored in storage units 1010 via storage unit interface 1012. Storage unit interface 1012 may be implemented as part of a container manager. File system control 1008 communicates with an index (not shown) to locate appropriate segments stored in storage units via storage unit interface 1012. Appropriate segments are retrieved from the associated containers via the container manager and are used to construct the requested file. The file is provided via interface 1002 in response to the request. In one embodiment, file system control 1008 utilizes a tree (e.g., a segment tree) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
receiving, by a data collector hosted at a server, periodically data replication characteristics from at least one of a source storage and a target storage, the data replication characteristics being extracted from a replication process of the source storage replicating data to the target storage, wherein the source and target storages are separate storage systems coupled to the server over a network, and wherein the replication characteristics comprise an ingest rate of the source storage and a replication rate from the source storage to the target storage;
analyzing, by a replication analyzer hosted at the server, the periodically received data replication characteristics at a replication management server communicatively coupled with the source storage and the target storage, including determining one or more replication features from at least a subset of the plurality of periods of replication characteristics, wherein a replication feature comprises a change in one or more of the replication characteristics over at least a subset of the plurality of periodically received data replication characteristics;

saving the periodically received data replication characteristics for each of a plurality of periods in a replication feature database, including saving the one or more features to the replication feature database;

predicting, by a predictive module, a probability of degradation of replication performance by applying a predictive modeling to at least a subset of the plurality of periods of the periodically received data replication characteristics; and sending, by a fault notifier, a notification in response to the probability of degradation of replication performance reaching a first predetermined threshold such that a corrective measure can be performed before the predicted degradation of replication performance occurs.

2. The method of claim 1, wherein at least one of the source storage and the target storage is a deduplicating storage system.

3. The method of claim 1, wherein the replication feature database is communicatively coupled with the replication management server.

4. The method of claim 1, wherein the predictive modeling is based at least in part on a feature involving at least one of the following data replication characteristics:
a link speed of the network between the source storage and the target storage;
deduplication characteristics of the source storage; and
deduplication characteristics of the target storage.

5. The method of claim 1, further comprising replicating a portion of data in the source storage to the target storage and replicating another portion of data in the source storage to a second target storage in response to the possibility of degradation of replication performance reaches a second predetermined threshold.

6. The method of claim 1, wherein the notification is sent to an administrator, the administrator managing either the source storage or the destination storage.

7. A non-transitory computer-readable storage medium having instructions stored therein, which when executed by a processor, cause the processor to perform a operations, the operations comprising:
receiving periodically data replication characteristics from a source storage and a target storage, the data replication characteristics being extracted from a replication process of the source storage replicating data to the target storage, wherein the source and target storages are separate storage systems coupled to each other over a network, and wherein the replication characteristics comprise an ingest rate of the source storage and a replication rate from the source storage to the target storage;
analyzing the periodically received data replication characteristics at a replication management server communicatively coupled with the source storage and the target storage, including determining one or more replication features from at least a subset of the plurality of periods of replication characteristics, wherein a replication feature comprises a change in one or more of the replication characteristics over at least a subset of the plurality of periodically received data replication characteristics;
saving the periodically received data replication characteristics for each of a plurality of periods in a replication feature database, including saving the one or more features to the replication feature database;
predicting a probability of degradation of replication performance by applying a predictive modeling to at least a subset of the plurality of periods of the periodically received data replication characteristics; and
sending a notification in response to the probability of degradation of replication performance reaching a first predetermined threshold such that a corrective measure can be performed before the predicted degradation of replication performance occurs.

8. The non-transitory computer-readable storage medium of claim 7, wherein at least one of the source storage and the target storage is a deduplicating storage system.

9. The non-transitory computer-readable storage medium of claim 7, wherein the replication feature database is communicatively coupled with the replication management server.

10. The non-transitory computer-readable storage medium of claim 7, wherein the predictive modeling is based at least in part on a feature involving at least one of the following data replication characteristics:
a link speed of the network between the source storage and the target storage;
deduplication characteristics of the source storage; and
deduplication characteristics of the target storage.

11. The non-transitory computer-readable storage medium of claim 7, wherein the method further comprising replicating a portion of data in the source storage to the target storage and replicating another portion of data in the source storage to a second target storage in response to the possibility of degradation of replication performance reaches a second predetermined threshold.

12. The non-transitory computer-readable storage medium of claim 7, wherein the notification is sent to an administrator, the administrator managing either the source storage or the destination storage.

13. A replication management server managing data replication between a source storage and a target storage, the replication management server communicatively being coupled with the source storage and the target storage, the replication management server comprising:
a data collector configured to receive periodically data replication characteristics from at least one of a source storage and a target storage, the data replication characteristics being extracted from a replication process of the source storage replicating data to the target storage, and configured to save the periodically received data replication characteristics for each of a plurality of periods in a replication feature database, wherein the source and target storages are separate storage systems coupled to the replication management server over a network, and wherein the replication characteristics comprise an ingest rate of the source storage and a replication rate from the source storage to the target storage;
a replication analyzer configured to analyze the periodically received data replication characteristics at the data collector, including determining one or more replication features from at least a subset of the plurality of periods of replication characteristics, wherein a replication feature comprises a change in one or more of the replication characteristics over at least a subset of the plurality of periodically received data replication characteristics, and wherein the one or more replication features are saved in the in replication feature database;
a predictive module configured to predict a probability of degradation of replication performance by applying a predictive modeling at least a subset of the plurality of periods of to the periodically received data replication characteristics; and a fault notifier configured to send a notification in response to the probability of degradation of replication performance reaching a first predetermined threshold such that a corrective measure can be performed before the predicted degradation of replication performance occurs.

14. The replication management server of claim 13, wherein at least one of the source storage and the target storage is a deduplicating storage system.

15. The replication management server of claim 13, wherein the replication feature database is communicatively coupled with the replication management server.

16. The replication management server of claim 13, wherein the predictive modeling is based at least in part on a feature involving at least one of the following data replication characteristics:
   a link speed of the network between the source storage and the target storage;
   deduplication characteristics of the source storage; and
   deduplication characteristics of the target storage.

17. The replication management server of claim 13, wherein the fault notifier suggests replicating a portion of data in the source storage to the target storage and replicating another portion of data in the source storage to a second target storage in response to the possibility of degradation of replication performance reaches a second predetermined threshold.

18. The replication management server of claim 13, wherein the notification is sent to an administrator, the administrator managing either the source storage or the destination storage.

\* \* \* \* \*